Jan. 27, 1942.  R. T. CORNELIUS  2,270,932
FAUCET
Filed April 20, 1940
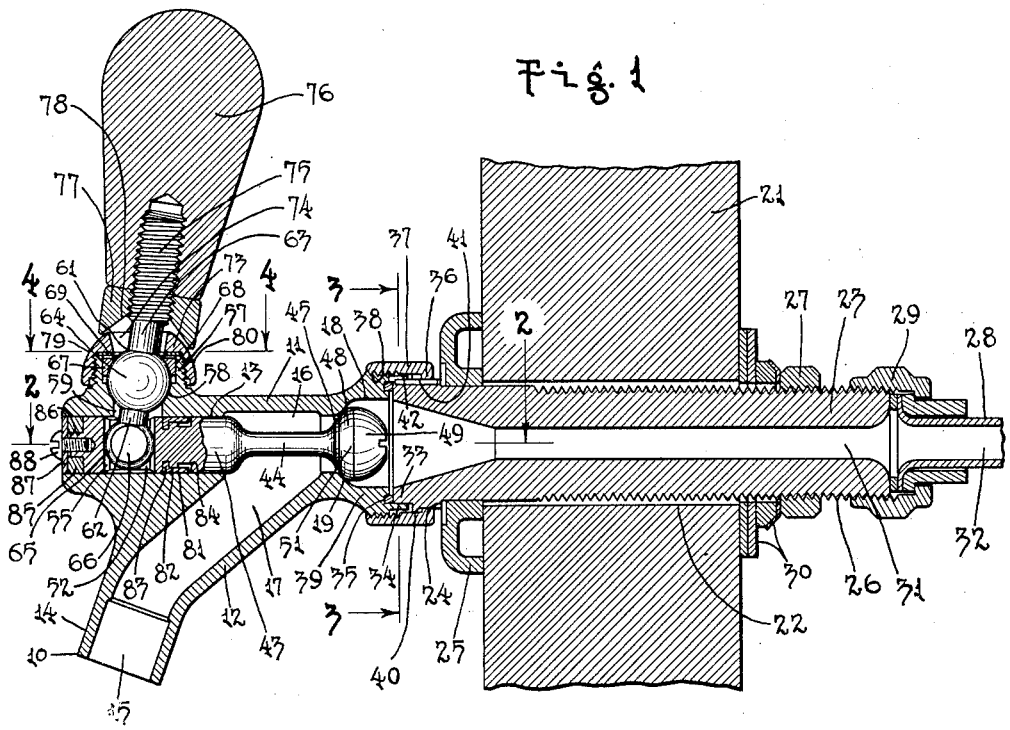
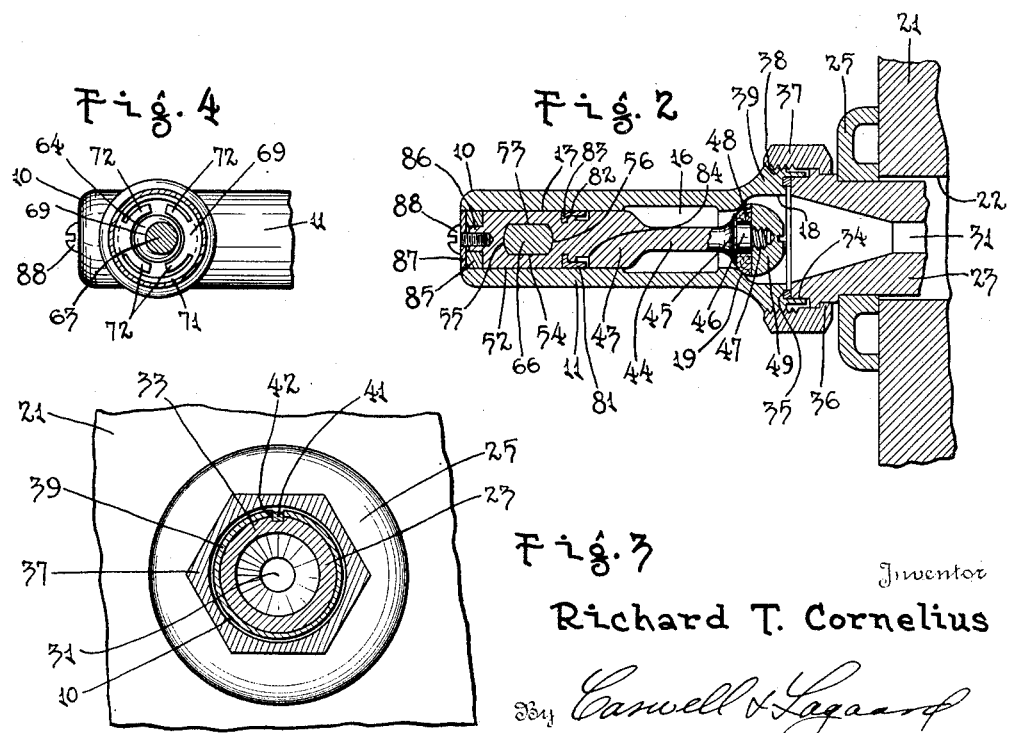
Inventor
Richard T. Cornelius
By Caswell & Lagaard
Attorneys Patented Jan. 27, 1942

2,270,932

UNITED STATES PATENT OFFICE 2,270,932

FAUCET

Richard T. Cornelius, Minneapolis, Minn.

Application April 20, 1940, Serial No. 330,748

6 Claims. (Cl. 251—41)

My invention relates to faucets and has for an object to provide an extremely simple and practical construction.

An object of the invention resides in providing a faucet which can be constructed largely from screw machine products.

Another object of the invention resides in providing a faucet in which the liquid controlled will rapidly and readily drain out of the same when the faucet is closed.

A still further object of the invention resides in constructing the faucet with a body having a longitudinal horizontally extending bore formed with a valve seat at one end thereof.

An object of the invention resides in providing a cylindrical plunger slidable along said bore and having connected thereto a valve member for engagement with the valve seat.

A feature of the invention resides in constructing said plunger with an opening therein forming shoulders and in providing a lever pivoted to said body and having an arm extending into said opening and engaging said shoulders for reciprocating said plunger.

A still further object of the invention resides in constructing the body with a socket and in forming on the lever a ball seated in the socket.

A further object of the invention resides in the specific construction for holding the ball within the socket.

Another object of the invention resides in providing a head on the end of the arm extending into the opening for engaging the walls of the plunger at the opening to reciprocate the same.

A still further object of the invention resides in constructing the opening and head in a manner such that rotation of the plunger and the lever are prevented in both.

A feature of the invention resides in constructing the opening so as to form in the plunger curved end walls and spaced parallel side walls bounding the opening.

Another object of the invention resides in constructing the head on the lever spheroidal in form and of the same curvature as the curved end walls of the plunger and in forming flat faces on said head adapted to fit in between the spaced parallel walls of the plunger to hold both the plunger and lever from rotation.

Another object of the invention resides in the specific arrangement of the various parts of the faucet.

Other objects of the invention reside in the novel combination and arrangement of parts and in the details of construction hereinafter illustrated and/or described.

In the drawing:

Fig. 1 is an elevational sectional view of a faucet illustrating an embodiment of my invention.

Fig. 2 is a plan sectional view taken on line 2—2 of Fig. 1.

Fig. 3 is an elevational sectional view taken on line 3—3 of Fig. 1.

Fig. 4 is a plan sectional view taken on line 4—4 of Fig. 1.

My improved faucet comprises a body 10 having a horizontal portion 11 and an inclined portion 12 connected therewith and extending downwardly from the portion 11. The portion 11 is constructed with a bore 13 which extends throughout the length of the same and completely through the body 10 at both ends thereof. The portion 12 is constructed at its lower end with a spout 14 which is provided with a discharge outlet 15. The intermediate portion of the bore 13 is provided with an enlargement 16 which forms a chamber adapted to communicate with the discharge outlet by means of a passageway 17 formed in the inclined portion 12. The extreme end of the bore 13 situated at the right hand end of the body 10, as viewed at Fig. 1, is further enlarged as designated at 18 to form an inlet to the said bore and to provide a shoulder 19 which serves as a valve seat.

The faucet is preferably attached to a wall or some similar structure and for the purpose of illustration a portion of a wall 21 of a cooling cabinet has been shown which is provided with a hole 22 extending through the same. A nipple 23 projects through this opening. This nipple is constructed at its outer end with a shoulder 24 and is encircled by a collar 25 seated against the outer surface of the portion of the wall 21 of the cooling cabinet and against said shoulder. The nipple 23 is threaded, as indicated at 26, to receive a nut 27 which engages one of a number of washers 30 disposed on the other side of the wall 21 and holds the nipple attached to the said wall. The nipple 23 is connected to a tube 28 by means of a coupling 29, whereby the passageway 31 in said nipple communicates with the passageway 32 in the tube 28. Tube 28 is connected to the source of the liquid to be dispensed and where beer is to be dispensed said tube is usually connected to the cooling coil of the system or forms a part thereof.

The faucet body 10 is attached to the nipple 23 in the following manner: The extreme end 33 of the nipple 23 is received within a socket 34 formed in the end of the portion 11 of body 10 having the passageway 18 therein. In this recess is mounted a gasket 35 which is engaged by the end 33 of the nipple. Nipple 23 is further constructed with a shoulder 40 which is adapted to be engaged by a flange 36 formed on a threaded nut 37. This nut is adapted to be screwed on threads 38 formed on an enlargement 39 on the end of the portion 11 of body 10. When the nut 37 is tightened, the body 10 is drawn toward the nipple 23 and the gasket 35 forms a seal between said body and nipple. To prevent rotation of the body a pin 41 is employed which is attached to the said nipple and which is received in a slot 42 in the enlargement 39 of the portion 11 of body 10.

Slidably mounted within the bore 13 is a plunger 43 which is constructed with a reduced shank 44 having a valve member 51 at the end thereof. The construction of the valve member 51 is best shown in Fig. 2. The plunger 43 is constructed at its end with a flange 45 and is provided with a stem 46 disposed outwardly beyond said flange, which stem has issuing from it a threaded stud 47. Encircling the stem 46 is a valve disc 48 of somewhat compressible material which is adapted to engage the valve seat 19. This valve disc is held in position by means of a spheroidal shaped nut 49 which is threaded on the stud 47. The shank 44 is situated at the locality of the chamber 16 and serves to permit the liquid entering the inlet 18 to pass freely into the chamber 16 and from said chamber through the passageway 17 and out of the outlet 15 of the nozzle 14. It will readily be comprehended that the structure attached to the end of the shank 44 constitutes a valve member which I have indicated in its entirety by the reference numeral 51. When the plunger 43 is reciprocated in the bore 13, valve member 51 is moved from opening to closing position to permit the liquid to flow from opening to closing position to permit the liquid to flow from the passageway 31 and into the chamber 16.

The plunger 43 is reciprocated by means of the following construction. In said plunger is formed an opening 52 which extends vertically through the same and is so constructed as to form in the said plunger spaced parallel side walls 53 and 54 and arcuate end walls 55 and 56 which form abutments or shoulders by means of which the plunger 43 may be reciprocated. Issuing upwardly from the horizontal portion 11 of body 10 is a threaded neck 57. In the lowermost portion of this neck is formed a spherical socket 58. This neck has an opening 59 therein which communicates with the bore 13. The plunger 43 is operated by means of a lever 61 which is constructed with an arm 62 extending through the opening 59 and into the opening 52 and with another arm 63 projecting outwardly from the body 10. This lever is provided with a ball 64 intermediate the ends thereof which is disposed between the two arms 62 and 63 and which is seated in the socket 58. The ball 64 serves as a fulcrum for the lever 61 and permits of swinging the said lever in a forward and rearward direction.

The arm 62 of lever 61 has formed on the end of it a head 65. This head is spherical in form and of the same curvature as the curved walls 55 and 56 of the plunger 43 formed at the opening 52 thereof and fits snugly against the same. By means of this construction the plunger may be reciprocated within the bore 13 and the curved surfaces of the head 65 slide along the walls 55 and 56 and at the same time urge the plunger 43 to reciprocate. The head 65 is formed with two flat surfaces 66 which are parallel with one another and which are adapted to engage the walls 53 and 54 of the plunger 43. By means of these surfaces the lever 61 is held from rotation and guided for movement in a vertical plane in a back and forth direction. At the same time the plunger 43 is held from rotation by means of the same construction. The head 65 is slightly smaller in diameter than the opening 59 in neck 57 so that the lever 61 may be installed through the open end of said neck.

The ball 64 is held seated against the seat 58 by means of a collar 67 which is guided for vertical movement in a cylindrical socket 68 in the outermost portion of the neck 57. This collar engages the ball 64 and is urged into engagement therewith by means of a spring 69, best shown in Fig. 4. This spring has an annular portion 71 seated on the end of the neck 57 and is constructed with spring fingers 72 disposed inwardly thereof, which fingers project into the socket 68 and engage the uppermost portion of the collar 67. These fingers force the collar downwardly and into engagement with the ball 64 thereby holding the ball in proper position. The spring 69 is held in place by means of a threaded nut 80 which has a flange 73 overlying the annular portion 71 of the spring and clamping the same against the end of the neck 57. Nut 80 has an opening 74 therein through which the arm 63 of lever 61 extends.

The extreme end of the arm 63 is threaded as indicated at 75 to form a shank to which a handle 76 may be attached. Handle 76 may be in any desired form and is preferably constructed of a heat insulating material. Screwed on the threads 75 of arm 63 is a lock nut 77 which holds the handle 76 in position. This lock nut serves as a collar and is formed with a conical socket 78 at its exposed end which cooperates with a spheroidal surface 79 formed on the exterior of the nut 80. By means of this construction the opening 74 in said nut is at all times closed and foreign material prevented from entering into the same.

To prevent leakage along the plunger 43 a ring 81 of expansible material is employed which is mounted in a groove 82 in the plunger 43. This ring has a flange 83 which holds the ring in position. The groove 82 is recessed in back of the said ring, as indicated at 84, to permit the fluid leaking from the chamber 16 and into the bore 13 to reach a space in back of the ring 81. The pressure in the fluid in said space forces the ring 81 outwardly and effects a seal between the plunger 43 and the bore 13 which prevents leakage of liquid outwardly of the faucet and past the ring 81.

In order to hold the valve 51 and plunger 43 in any adjusted position a friction washer 85 is employed which is mounted on a stem 86 formed on the end of plunger 43. This washer is held in position by means of a metal washer 87 and a screw 88 which bears against the washer 87 and is threaded into the stem 86. By tightening the screw 88 the washer 85 can be expanded to afford any desired friction with relation to the bore 13 whereby the plunger 43 and the valve member 51 may be held in proper position.

In the operation of my invention the valve member 51 is moved from open to closed position and vice versa by means of the lever 61 through manipulation of handle 76. This is accomplished by swinging the handle 76 in a forward and rearward direction. When moved forward the valve member 51 is unseated from the seat 19 and the liquid flows through the passageway 31, inlet 18, past the valve member 51 and into the chamber 16. From chamber 16 the liquid flows along the passageway 17 and out of the faucet through the outlet 15 and from the nozzle 14. By means of the friction washer 85 the valve member 51 may be held in any position between fully open and fully closed position and the rate of flow of liquid through the outlet 15 thus positively controlled. When the valve member 51 is in closing position the pressure of the liquid within the inlet 18 assists in holding the valve member closed.

The advantages of my invention are manifest. The device is extremely simple in construction and is easy to operate. By unscrewing the nut 80 the operating lever and handle may be removed from the neck 57. By unscrewing the nut 37 the entire faucet may be removed from the nipple 23 and when removed the plunger 43 and valve member 51 are easily withdrawn from the bore 13. It will thus be seen that the valve can be easily taken apart and readily cleaned. The liquid in passing through my improved faucet takes a direct course and does not have to make numerous turns or pass over sharp corners. This is particularly advantageous where beer is being dispensed since a minimum amount of agitation to the beer results in passing through the faucet. My invention can be constructed at an extremely economical cost. Due to the fact that only two moving parts are utilized with the invention a very slight effort is required in operating the faucet.

Changes in the specific form of my invention, as herein disclosed, may be made within the scope of what is claimed without departing from the spirit of my invention.

Having described my invention, what I claim as new and desire to protect by Letters Patent is:

1. In a faucet, a body, a valve member within said body, a socket formed in said body a lever having an arm for operating said valve member, a ball formed on said lever and seated in said socket, a threaded neck encircling said socket and projecting outwardly from said body, a cap screwed on said neck for holding said ball within said socket, said cap being constructed with a spheroidal exterior surface and having an opening therethrough, said lever having a threaded shank extending through said opening, a collar formed with a conical depression mounted on said shank and overlying the opening in said cap, said collar following along the spheroidal surface of said cap to maintain said opening closed at all positions of said shank and a handle secured to said shank in proximity to said collar.

2. In a faucet, a body having a cylindrical bore, a cylindrical plunger slidable along said bore, a valve member operated by said plunger, said plunger having a transversely extending opening therein providing in said plunger transversely extending cylindrical end walls and spaced parallel side walls, said end walls being concentric and arranged with their axis extending diametrically of the plunger, said opening being of a uniform cross section throughout its extent; a lever pivoted to said body at a locality laterally of said bore and having an arm extending into said opening, a spherical head on said arm of the same curvature as the curvature of said end walls and adapted to engage said end walls for reciprocating said plunger, said head having two flat sides adapted to engage the sides of said plunger and serving to hold the plunger from rotation the transverse cross-section of said head taken at any diametral plane which is at right angles to said sides, being the same as the cross-section of said opening.

3. In a faucet, a body having a cylindrical bore, a cylindrical plunger slidable along said bore, a valve member operated by said plunger, said plunger having a transversely extending opening therein providing in said plunger diametrically extending end walls forming shoulders and spaced parallel side walls, said body having a spheriodal shaped socket therein disposed laterally of and in proximity to the opening in said plunger, a lever having an arm extending into said opening and a ball mounted for oscillation in said socket, said arm being constructed with a head having side walls adapted to engage the side walls of said plunger and serving to hold said plunger from rotation in said bore and said lever from rotation about its longitudinal axis in said socket, said head engaging said shoulders and reciprocating said plunger within the bore, means engaging said ball and cooperating with said socket for pivoting said lever for swinging movement, said means restraining longitudinal movement of said lever and retaining said head within said opening, and means on said lever disposed exteriorly of said body for operating the same.

4. In a faucet, a body having a cylindrical bore open at one end, a cylindrical plunger slidable along said bore, valve means at the other end of the bore, a valve member operated by said plunger and cooperating with said valve means, means carried by said body for reciprocating said plunger, and a friction member encircling said plunger and engaging the bore of said body, said friction member being disposed substantially at the end of said plunger and outwardly of said means for reciprocating the plunger, said friction member holding the plunger in different positions within the bore, and means carried by said plunger and accessible through the open end of the bore for varying the pressure exerted by said friction member.

5. In a faucet, a body having a cylindrical bore open at one end, a cylindrical plunger slidable along said bore, valve means at the other end of the bore, a valve member operated by said plunger and cooperating with said valve means, means carried by said body for reciprocating said plunger, a stem formed on the outer end of said plunger, a friction washer encircling said stem and bearing against said bore, a pressure washer bearing against said friction washer, and a screw engaging said pressure washer and threaded into said plunger for varying the pressure between said friction washer and bore, said screw being accessible through the open end of said bore.

6. In a faucet, a body having a cylindrical bore, a cylindrical plunger slidable along said bore, a valve member operated by said plunger, said plunger having a transversely extending opening therein providing in said plunger transversely extending cylindrical end walls and spaced parallel side walls, said end walls being concentric and arranged with their axis extending diametrically of the plunger, said opening being of a uniform cross-section throughout its extent, a neck formed on said body at the locality of the opening in said plunger and having an opening therein communicating with said bore, a lever disposed within the opening in said neck and having a portion projecting outwardly beyond said neck, means for pivoting said lever to said neck for swinging movement in a plane containing the axis of said bore, a spherical head on the inner end of the lever, said head being of the same curvature as the curvature of the end walls and adapted to engage said end walls for reciprocating said plunger, said head having two flat sides adapted to engage the sides of said plunger and serving to hold the plunger from rotation, the transverse cross-section of said head taken at any diametral plane which is at right angles to said sides, being the same as the cross-section of said opening.

RICHARD T. CORNELIUS.